Patented June 17, 1941

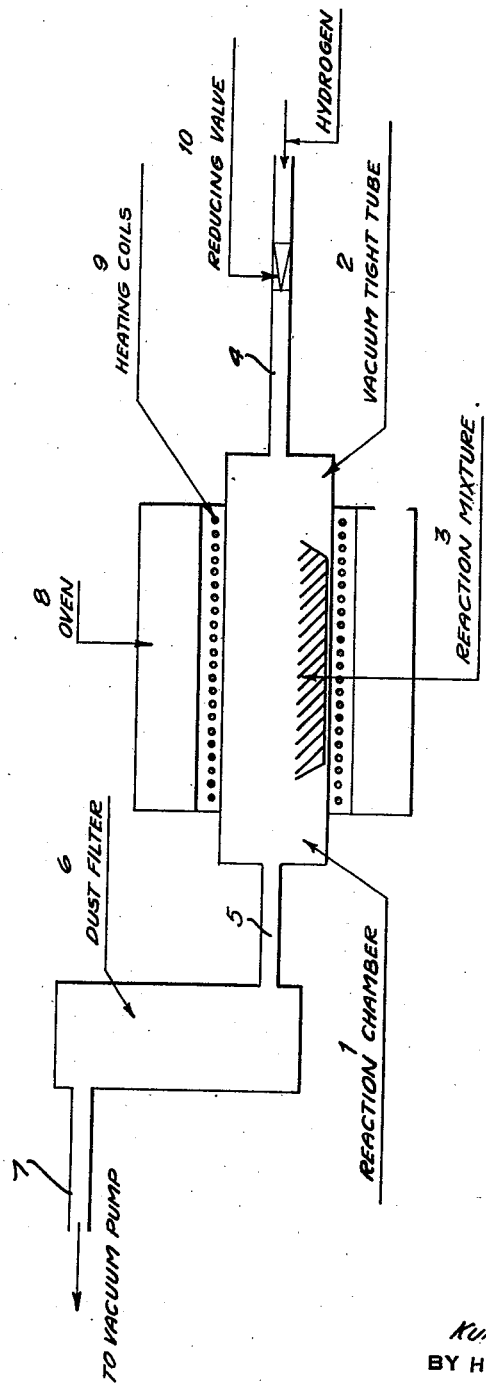

2,246,386

UNITED STATES PATENT OFFICE 2,246,386

PROCESS OF PREPARING METALLIC CHROMIUM FROM CHROMIUM CHLORIDE

Kurt Schneider, Sandersdorf, Kreis Bitterfeld, Germany, assignor to I. G. Farbenindustrie Aktiengesellschaft, Frankfort-on-the-Main, Germany Application December 27, 1939, Serial No. 311,127
In Germany January 25, 1939

6 Claims. (Cl. 75—84)

Various processes are already known for reducing chromium chloride with hydrogen at ordinary pressure so as to obtain metallic chromium. On carrying out these processes it is necessary to keep the hydrochloric acid-partial pressure in the reaction chamber very low in order to prevent the hydrochloric acid produced from acting on the chromium formed and the chromium chloride from being re-formed. Moreover, for carrying out the process in a satisfactory manner, the hydrogen must be subjected to a careful and very complicated purification process before being used because impurities, especially oxygen, produce a detrimental effect. If oxygen or even traces of oxygen are present in the hydrogen there occurs a partial oxidation of the metal formed and furthermore of the chromium chloride so as to obtain oxychloride. The reduction of these two oxidation products would, however, require the application of such high temperatures that a considerable loss of chromium chloride owing to volatilization could not be avoided.

The obvious measure of keeping the hydrochloric acid-partial pressure in the reaction chamber very low by an increased velocity of flow of the hydrogen and to reconduct into the reaction chamber the hydrogen from which the gaseous hydrogen chloride contained therein has been eliminated, failed owing to the expensive purification devices which render the process uneconomical.

Now I have found a process which allows the preparation of metal chromium in a simple manner and while avoiding the fore-discussed drawbacks. The present invention is based upon the observation that chromium chloride in which chromium is suitably present in the bivalent form can be reduced to metallic chromium with the aid of hydrogen as reducing agent in a satisfactory manner and without any detrimental by-reactions by carrying out the reduction under a highly reduced pressure.

Hence results the advantage that the hydrogen chloride formed is rapidly eliminated from the zone of reaction already if relatively small quantities of the hydrogen required for the reduction are passed over, whereas on the other hand the oxygen-partial pressure in the atmosphere of the furnace without a previous purification of the hydrogen is so small that chromium chloride or the metal reduced therefrom is substantially no longer oxidized.

The accompanying drawing illustrates diagrammatically and by way of example only, apparatus by means of which the present process can be carried out. Reaction chamber 1 is made of a vacuum-tight tube 2 and has placed therein reaction mixture 3. The hydrogen is introduced to reaction chamber 1 by means of line 4 while the mixture of hydrogen and reaction gases is withdrawn from reaction chamber 1 through line 5 and passed into dust filter 6. The system is kept under a vacuum by a vacuum pump which is not shown but is connected to line 7. Tube 2 rests in an oven 8 to which heat is supplied by means of heating coils 9. The rate at which the hydrogen is introduced is regulated by reducing valve 10 in line 4.

According to the invention the pressure of the hydrogen in the reaction chamber amounts to at most about 100 mm. of mercury and is suitably kept between 10 and 50 mm. of mercury. In order to attain a sufficient reaction velocity the reduction is carried through at a temperature superior to 800° C., preferably at a temperature between 900° C. and 1000° C.

At the temperatures between 900° C. and 1000° C. preferably applied chromous chloride is reduced within a short time to metallic chromium; an evaporation of the chloride cannot be noticed.

If chromic chloride is used as parent material it is suitable to subject this product first to a preliminary reduction at a temperature between 300° C. and 600° C. so as to obtain chromous chloride because the tri-chloride possesses a considerable vapor pressure already at 700° C.

The preliminary reduction may advantageously be carried through directly in the reaction chamber destined for the preparation of the chromium metal by gradually heating the material introduced into the furnace and consisting of chromic chloride in a current of hydrogen to the temperature required for the reduction to obtain the metal desired.

The following examples serve to illustrate the invention, but they are not intended to limit it thereto:

1. Chromic chloride is introduced into a vacuum furnace which is connected with a vacuum pump having an output of 6 cubic meters per hour. The access of hydrogen into the reaction chamber is adjusted by a reducing valve mounted at the pressure tube in such a manner that a pressure of 20 mm. of mercury is present in the reaction chamber. By the supply of heat the temperature in the interior of the furnace is increased in the course of 60 minutes to 900° C. and this temperature is maintained for 30 minutes. After this period the chromium chloride has been reduced to metal spangles. 99.5 per cent of said spangles consist of metallic chromium.

2. Chromous chloride is introduced into a device as described in Example 1; there exists, however, the difference that the temperature in the reaction zone has already been raised to 900° C. After hydrogen has been allowed to act on chromous chloride under a pressure of 35 mm. of mercury there is obtained a chromium metal free from chlorine and of a purity of 99 per cent.

What I claim is:

1. The process for producing metallic chromium which comprises passing a current of unpurified, technically produced hydrogen over chromium chloride at an elevated temperature under reduced pressure of at most about 100 mm. Hg.

2. The process for producing metallic chromium which comprises passing a current of unpurified, technically produced hydrogen over chromous chloride at a temperature higher than 800° C. under reduced pressure of at most about 100 mm. Hg.

3. The process for producing metallic chromium which comprises passing a current of unpurified, technically produced hydrogen over chromic chloride at a temperature between 300 and 600° C. and continuing the reduction at a temperature higher than 800° C. under reduced pressure of at most about 100 mm. Hg.

4. The process for producing metallic chromium which comprises passing a current of unpurified, technically produced hydrogen over chromous chloride at a temperature between 900 and 1000° C. under reduced pressure of at most about 100 mm. Hg.

5. The process for producing metallic chromium which comprises passing a current of unpurified, technically produced hydrogen over chromous chloride at a temperature higher than 800° C. under a pressure between 10 and 50 mm. Hg.

6. The process for producing metallic chromium which comprises passing a current of unpurified, technically produced hydrogen over chromous chloride at a temperature between 900 and 1000° C. and under a pressure between 10 and 50 mm. Hg.

KURT SCHNEIDER.